United States Patent
Taylor et al.

(10) Patent No.: US 8,189,231 B1
(45) Date of Patent: May 29, 2012

(54) AUTOMATED MECHANICAL APPROVAL OF ADVERTISEMENT COPY

(75) Inventors: Isaac Taylor, New York, NY (US); Nicolae Crucian, New York, NY (US); Aleem R. Mawani, Ontario (CA); David Hofer, New York, NY (US)

(73) Assignee: Google Inc., Mountain View, CA (US)

( * ) Notice: Subject to any disclaimer, the term of this patent is extended or adjusted under 35 U.S.C. 154(b) by 829 days.

(21) Appl. No.: 12/211,755

(22) Filed: Sep. 16, 2008

Related U.S. Application Data

(60) Provisional application No. 60/973,146, filed on Sep. 17, 2007.

(51) Int. Cl.
*H04N 1/60* (2006.01)
*G06F 3/12* (2006.01)
*G06K 15/00* (2006.01)

(52) U.S. Cl. .......... 358/1.9; 358/1.15; 358/1.18

(58) Field of Classification Search ............ 358/1.9, 358/1.15, 1.2, 1.6, 1.18, 540
See application file for complete search history.

(56) References Cited

U.S. PATENT DOCUMENTS

| | | | |
|---|---|---|---|
| 5,666,493 A | 9/1997 | Wojcik et al. | |
| 6,026,368 A | 2/2000 | Brown et al. | |
| 6,167,382 A | 12/2000 | Sparks et al. | |
| 6,401,075 B1 | 6/2002 | Mason et al. | |
| 6,446,045 B1 | 9/2002 | Stone et al. | |
| 6,829,587 B2 | 12/2004 | Stone et al. | |
| 6,839,149 B2 * | 1/2005 | Herr | 358/1.15 |
| 6,985,882 B1 | 1/2006 | Del Sesto | |
| 7,240,025 B2 | 7/2007 | Stone et al. | |
| 7,249,059 B2 | 7/2007 | Dean et al. | |
| 2008/0167957 A1 | 7/2008 | Steelberg et al. | |

FOREIGN PATENT DOCUMENTS

WO  WO97/21183  6/1997

OTHER PUBLICATIONS

Zeff et al. *Advertising on the Internet*, 2d edition, Robert Ipsen, 1999 (454 pp).
Ad Force User Guide, *A Complete Guide to AdForce*. Version 2.6, AdForce, Inc. 1998.
*AdManagerPro Adminstrator's Manual*, Version 2.0, Baseview Harris. 1998.
*ClassManagerPro Administration and Receivables Manual*, Administrator's Manual, Version, 1.0.5, Baseview Products, Inc. Feb. 1, 1997.
[online], Ad-Star, retrieved from http://web.archive.org/web/19970412171433/www.adstar.com/about.html [retrieved on Apr. 12, 1997 & Feb. 1, 1997].
AdForce, Inc. S-1/A SEC Filing, May 6, 1999.

(Continued)

*Primary Examiner* — Charlotte M Baker
(74) *Attorney, Agent, or Firm* — Fish & Richardson P.C.

(57) ABSTRACT

Methods, systems, and apparatus for evaluating an advertisement. In one aspect, a method includes receiving an electronic file comprising an advertisement; receiving one or more ad space parameters associated with a publication; comparing one or more attributes of the advertisement with the one or more ad space parameters; generating results based on the comparison of the one or more attributes of the advertisement with the one or more ad space parameters; determining whether to accept the advertisement for publication based on the generated results; and altering at least one of the one or more attributes of an unaccepted advertisement such that it conforms with a corresponding ad space parameter.

27 Claims, 5 Drawing Sheets

OTHER PUBLICATIONS

Reexam of U.S. Patent No. 6,829,587 B2 (*Function Media, LLC* v. *Google Inc.*, US District Court for the E. District of TX, Marshall Div., Civil Action No. 2:07-CV-279), Jul. 14, 2008.
AdKnowledge Campaign Manager: Reviewer's Guide, AdKnowledge, Aug. 1998.
AdKnowledge Market Match Planner: Reviewer's Guide, AdKnowledge, May 1998.
Baseview Products, Inc., AdManagerPro Administration Manual v. 2.0, Dec. 1998.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," ©1997.
Information Access Technologies, Inc., Aaddzz.com website archive from www.archive.org, archived on Jan. 30, 1998.
Robbin Zeff and Brad Aronson, *Advertising on the Internet*, John Wiley & Sons, 1997.
Robbin Zeff and Brad Aronson, *Advertising on the Internet*, 2nd Ed., John Wiley & Sons, 1999.
Steelberg, Chad, *Integrating Placement of Advertisements in Multiple Media Types*, U.S. Appl. No. 60/817,655, filed with the USPTO Jun. 28, 2006.

* cited by examiner

AUTOMATED MECHANICAL APPROVAL OF ADVERTISEMENT COPY

This application claims priority to U.S. Provisional Patent Application Ser. No. 60/973,146 filed on Sep. 17, 2007, entitled "System and Method for Automated Mechanical Approval of Advertisement Copy." The disclosure of the prior application is considered part of, and is incorporated by reference in, the disclosure of this application.

TECHNICAL FIELD

The following disclosure relates to computer-implemented systems and techniques for automatically evaluating an advertisement, and for determining whether a received advertisement complies with one or more mechanical requirements specified by a publisher.

BACKGROUND

Advertisers can submit advertising copy (or "ad copy") to a publisher for inclusion in a printed publication, such as a newspaper or a magazine. Typically, the ad copy can be provided in the form of a proof, which presents the advertisement using the format in which the advertisement should be run. The proof can be in hard copy form or electronic form. The publisher then can manually process the proof to incorporate it into the printed publication.

An advertiser typically also specifies the placement of the ad copy in the printed publication, including parameters such as the edition in which the ad copy is to appear, the page on which the ad copy is to run, and the size of the advertisement. If the ad copy supplied by the advertiser fails to satisfy one or more threshold criteria, the ad copy may not be included in the desired printed publication. Further, manual processing of the ad copy can delay notification to the advertiser that a piece of ad copy fails to satisfy one or more criteria.

An advertiser also must determine what advertising space is available for a particular edition of a printed publication. Typically, an advertiser can interact with the publisher to determine the format of the printed publication and the advertisement sizes available. For example, the size of an advertisement can be expressed using a number of parameters, including the height, width, and/or number of columns. The available advertising space can change between editions and also between sections of a single edition.

Once made, an offer to purchase advertising space in a printed publication is evaluated by the publisher to determine whether the ad copy will be accepted. If the ad copy conforms to the particular specifications of the advertising space available in a publication, the publisher can choose to accept the offer. Historically, advertisers have negotiated terms directly with the publisher, such as through a sales representative. For example, a publisher could provide standard rates and terms for a particular publication. If an advertiser accepted those terms, the ad copy would be placed in the printed publication. Further, a publisher can offer special terms or preferential pricing, such as for volume customers and new advertisers. Generally, the applicable rates and terms have been provided to advertisers upon request.

SUMMARY

An automated, scalable advertisement ("ad") evaluation system can be implemented to evaluate and correct advertisement offers to ensure that an ad complies with the mechanical specifications corresponding to an available ad space. The ad evaluation system can be implemented as an online, e.g., web-based, automated evaluation and correction tool.

The present inventors recognized the need to develop a system to receive an advertisement associated with an electronic file and submit the advertisement to an automatic evaluation and correction process. The system can be implemented to compare the size of an advertisement submitted for inclusion in a publication with the available ad space size in the publication. The system also can be implemented to compare additional attributes of the advertisement with the mechanical specifications of the available ad space in the publication.

In one aspect a computer-implemented method for evaluating an advertisement includes receiving an electronic file including an advertisement. One or more ad space parameters associated with a publication are received. One or more attributes of the advertisement are compared with the one or more ad space parameters. Results based on the comparison of the one or more attributes of the advertisement with the one or more ad space parameters are generated. Whether to accept the advertisement for publication based on the generated results is determined. Altering at least one of the one or more attributes of an unacceptable advertisement such that it conforms with a corresponding ad space parameter.

This and other aspects can include one or more of the following features. The generated results can be stored in a database. The generated results can include designating the advertisement for approval, rejection, or manual review. The generated results can be provided to an advertiser associated with the advertisement. At least one of the one or more attributes of the advertisement can be altered such that it conforms with a corresponding ad space parameter. One or more color attributes of the advertisement can be altered such that it conforms with a corresponding ad space parameter. One or more size attributes of the advertisement can be altered such that it conforms with a corresponding ad space parameter. Determining whether to accept the advertisement can include evaluating a size of the advertisement relative to an ad space size defined by the one or more ad space parameters. One or more attributes of the altered advertisement can be compared with the one or more ad space parameters. Results can be generated based on the comparison of the one or more attributes of the altered advertisement with the one or more ad space parameters. Whether to accept the altered advertisement for publication based on the generated results can be determined.

The techniques described in this specification can be implemented to realize one or more of the following potential advantages. For example, the techniques can be implemented to permit automatically determining whether a received advertisement complies with one or more mechanical requirements of a publication. In addition, the techniques can be implemented to automatically evaluate electronic advertisements and to correct advertisements that do not comply with the mechanical requirements of a publication. Moreover, the techniques can be implemented to permit automatically comparing the size of one or more available advertisement spaces in a corresponding publication with the size of an advertisement. The techniques also can be implemented to permit marking an advertisement for manual review if the difference between the size of the available advertisement space and the size of the advertisement is less than a predetermined threshold. The techniques also can be implemented to permit marking an advertisement for rejection if the difference between the size of the available advertisement space and the size of the advertisement exceeds a predetermined threshold. Furthermore, the techniques can be implemented to permit marking an advertisement for manually review if the difference between the size of the available advertisement space and the size of the advertisement falls within a predetermined range.

The techniques also can be implemented to permit automatically inspecting one or more attributes of an advertisement submitted for inclusion in a publication. In addition, the techniques can be implemented to automatically determine whether the one or more attributes of an advertisement contain an error or warning, or should be submitted for manual review based on the results of the inspection. Moreover, the techniques can be implemented to automatically accept, reject or correct an advertisement based on the results of the inspection. Furthermore, the techniques can be implemented to generate a notification to an advertiser if a submitted advertisement is rejected. The notification can include one or more grounds for rejection so that the advertiser can correct and resubmit the advertisement. In addition, the techniques can be implemented to automatically process advertisements containing varying levels of errors and/or warnings disparately. For example, advertisements with considerable errors can be prevented from being uploaded into an automated advertisement evaluation system. Conversely, advertisements with lesser errors can prompt the generation of a notification to an advertiser, warning the advertiser that the advertisement includes one or more errors.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
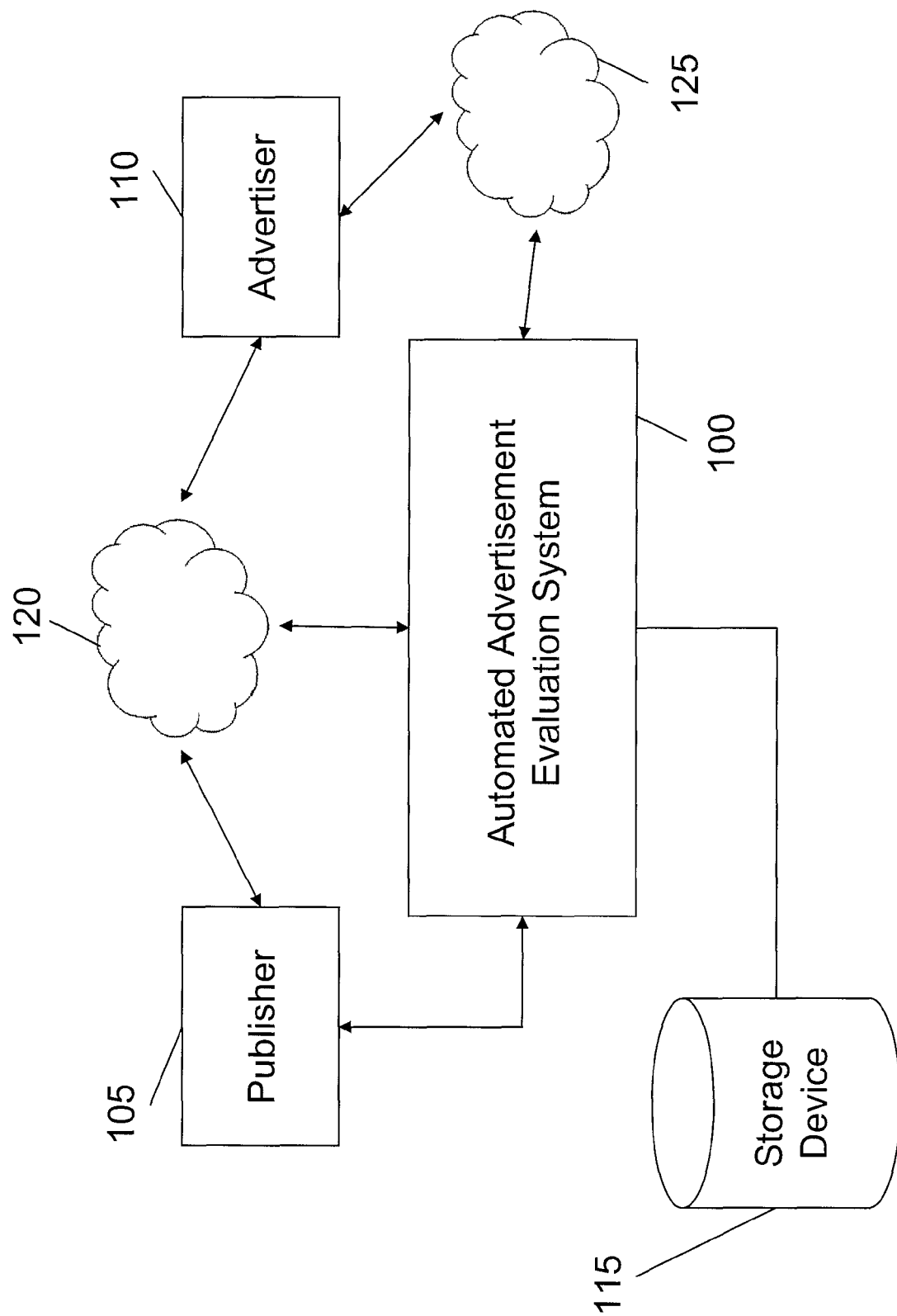
FIG. 1 shows an exemplary top-level block diagram of the input and output process for an automated advertisement evaluation system.

FIG. 1 shows an exemplary top-level block diagram of the input and output process for an automated advertisement evaluation system 100. The automated advertisement evaluation system 100 can be implemented as an online, e.g., web-based, evaluation and correction tool for evaluating and preparing advertisements for publication. Alternatively, the automated advertisement evaluation system 100 can be provided by a software application installed on a computer system. The automated advertisement evaluation system 100 can be implemented to ensure that a submitted advertisement complies with at least one available advertising space and the mechanical specifications of a corresponding publication. The publication can be a printed publication, such as a newspaper or a magazine. Alternatively, the publication can be an electronic publication with a displayable area, such as a web page or electronic display. A user, e.g., a publisher 105 can input in an automated advertisement evaluation system 100 one or more specifications associated with an advertising space of a particular publication. The publisher 105 can communicate with the automated advertisement evaluation system 100 through a network connection 120. A publisher user interface can be presented, which can include one or more prompts to specify information relating to the advertising space specifications of the publication. The publisher user interface prompts can include one or more drop-down menus with pre-populated options corresponding to one or more advertising space specifications. Alternatively, the user interface prompts can include one or more data entry fields, radio buttons, checkboxes, sliders, or other such graphical user interface widgets. Further, the advertising space specifications can include one or more of: ad space size, line width, resolution, embedded fonts and color, as well as other such advertisement space specifications.

Evaluation specifications for the evaluation of a submitted advertisement also can be input in the automated advertisement evaluation system 100. Evaluation specifications can include one or more of: error tolerances, color ranges, font sizes, font styles, deep packet inspection ranges, size tolerances, as well as other such evaluation specifications. For example, error tolerances can specify a measure, such as a percentage, by which the size of an advertisement submitted for inclusion in a publication can differ from the size of the available advertising space in the publication. The publisher user interface also can include one or more prompts associated with information relating to the evaluation of a submitted advertisement. An advertisement can be submitted as an electronic file, such as in an electronic document format. For example, an advertisement can be submitted in an Adobe®Acrobat® Portable Document Format ("PDF").

An advertisement submitted for publication can be input into the automated advertisement evaluation system 100. The advertisement can include ad copy data and other information, such as meta data. A user, such as an advertiser 110, can input the advertisement into the automated advertisement evaluation system 100. The advertiser 110 can communicate with the automated advertisement evaluation system 100 through a network connection 125. The advertiser 110 also can communicate with the publisher 105 and/or the automated advertisement evaluation system 100 through the network connection 120. Alternatively, an advertisement submitted for publication can be input into the automated advertisement evaluation system 100 by a publisher 105 or a third party. An advertiser user interface can be presented, which can include one or more prompts to specify the advertisement to be input into the automated advertisement evaluation system 100. The advertiser user interface prompts can include one or more drop-down menus with pre-populated options corresponding to one or more advertisements. Alternatively, the prompts can include one or more data entry fields, radio buttons, checkboxes, sliders, or other such graphical user interface widgets. The other advertisement information can include one or more of: ad size, format (color or black and white), publication section, publication page, font, presentation graphics, as well as other such information.

The automated advertisement evaluation system 100 can receive an advertisement in addition to advertising space specifications and evaluation specifications. Upon receiving the advertisement, advertising space specifications and evaluation specifications, the automated advertisement evaluation system 100 can automatically submit the advertisement to an evaluation process. The evaluation process can analyze the advertisement, based at least in part on the evaluation specifications of the particular publication for which the advertisement is submitted. The automated advertisement evaluation system 100 also can perform one or more checks to determine whether the advertisement complies with the advertising space specifications associated with the particular publication. The evaluation process can evaluate the size of the advertisement to determine whether the dimensions of the advertisement are acceptable with respect to the size of the available advertising space of the particular publication in which the advertisement is to appear. The evaluation process also can be implemented to correct any errors that are classified as correctable, which are found during analyzing the advertisement. The evaluation process can produce output related to determining whether the advertisement complies with the advertising space specifications. The output can include classifying an advertisement as approved, rejected, or flagged for manual review. Further, the output can be stored in a storage device 115 operatively coupled to the computer system. Alternatively, the output can be transferred to a remote location over one or more networks for storing. The storage device 115 also can be implemented to store specifications and requirements for one or more publications. For example, one or more specifications associated with an advertising space of a particular publication can be stored in the storage device 115 and can be input in the automated advertisement evaluation system 100.

When the automated advertisement evaluation system 100 classifies an advertisement as approved, the advertisement can be submitted for inclusion in a publication. Conversely, by classifying an advertisement as rejected, the automated advertisement evaluation system 100 can indicate that the advertisement contained one or more uncorrectable errors, which prevented the advertisement from being submitted for inclusion in the publication. The automated advertisement evaluation system 100 can generate a notification, e.g., a message, indicating that the advertisement has been rejected and will not be included in the publication. The automated advertisement evaluation system 100 also can send the notification to, e.g., the advertiser 110. The notification can include one or more grounds specifying why the advertisement was rejected. Upon receiving the notification, the advertiser 110 can correct the one or more errors associated with the rejected advertisement and can resubmit the advertisement to the automated advertisement evaluation system 100 for subsequent approval. In addition, the automated advertisement evaluation system 100 can classify an advertisement as flagged for manual review. Classifying an advertisement as flagged for manual review can indicate that the submitted advertisement requires further evaluation apart from the automated advertisement evaluation system 100.

Figure 2:
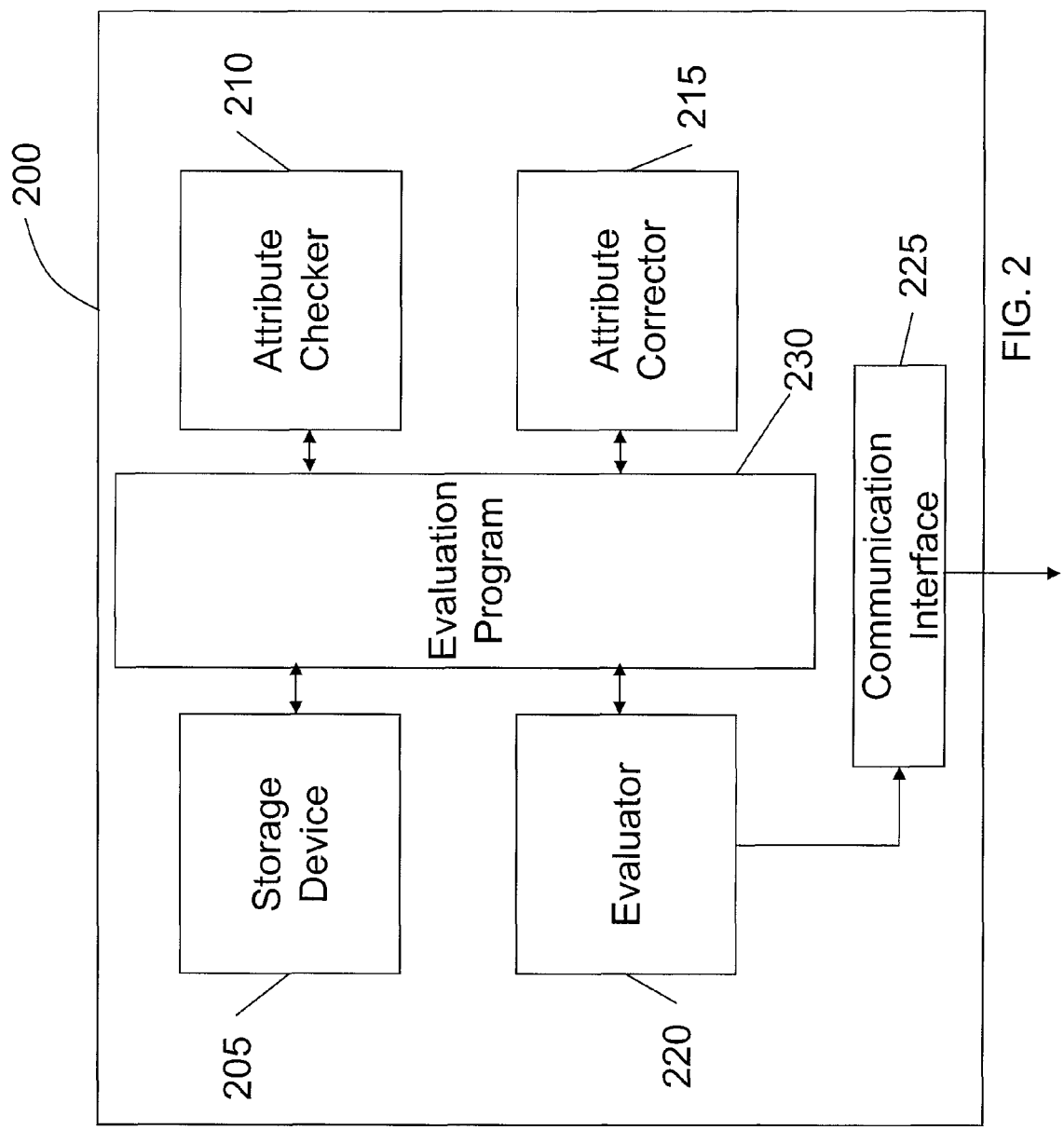
FIG. 2 shows an exemplary block diagram for an automated advertisement evaluation system.

FIG. 2 shows an exemplary block diagram for an automated advertisement evaluation system 200. The automated advertisement evaluation system 200 can be implemented to receive an advertisement. The received advertisement can be stored in a storage device 205 that is accessible to the modules of the automated advertisement evaluation system 200. An evaluation program 230 can connect the applications and modules of the automated advertisement evaluation system 200. The automated advertisement evaluation system 200 can include an attribute checker 210 configured to check one or more attributes of the advertisement. The one or more advertisement attributes can include ad size, color, white space, trim box, line width, resolution, embedded fonts, as well as other such attributes. The attribute checker 210 can inspect one or more attributes of an advertisement submitted for inclusion in a publication to determine if the advertisement complies with one or more mechanical requirements associated with the publication. The attribute checker 210 can be any application or module configured to verify one or more attributes of a file, including a commercially available electronic document processing program, such as "pdfInspektor4" by Callas Software GmbH (Berlin, Germany) or "Asura" by OneVision Software AG (Regensburg, Germany).

The automated advertisement evaluation system 200 also can include an attribute corrector 215 configured to correct one or more advertisement attributes. The attribute corrector 215 can correct an advertisement attribute so that the advertisement complies with one or more mechanical requirements specified for a target publication. For example, if an advertisement submitted for inclusion in a publication is larger than the ad space size of the publication, the attribute corrector 215 can re-size, scale, manipulate, or otherwise process the advertisement such that it will fit in the given ad space size. The attribute corrector 215 can be any application or module configured to correct one or more attributes of a file, including a commercially available electronic document processing program, such as "pdfInspektor4" by Callas Software GmbH, or "Asura" by OneVision Software AG.

The automated advertisement evaluation system 200 further can include an evaluator 220, which can evaluate, or otherwise compare, one or more attributes and/or dimensions of an advertisement with one or more attributes and/or dimensions of the ad space in a corresponding publication. The evaluator 220 can produce output corresponding to the evaluation, or comparison, of the advertisement dimensions with the publication's ad space dimensions. The output produced by the evaluator 220 can include messages, e.g., e-mail messages, and can be classified as: no error found, error found, warning found, or need for manual review. The output can be transmitted to a communication interface 225. The communication interface 225 can transmit the output outside the automated advertisement evaluation system 200.

No error found indicates that the advertisement dimensions are within the constraints of the publication's ad space dimensions. Error found indicates that at least one of the one or more advertisement dimensions are not within the constraints of the publication's ad space dimensions and further, are not correctable by the automated advertisement evaluation system 200. For example, if the attribute corrector 215 enlarges an advertisement to correspond with the ad space dimensions, a loss in the resolution of the advertisement can be so substantial that the evaluator 220 can deem the advertisement unfit for publication. Output indicating that a warning was found indicates that at least one of the one or more attributes and/or dimensions of an advertisement requires further evaluation. Further evaluation can include manual review outside the automated advertisement evaluation system 200. Output identifying a need for manual review indicates that at least one of the one or more advertisement attributes or dimensions requires manual evaluation. Manual evaluation can be performed in conjunction with the automated advertisement evaluation system 200, such as by an administrator or publisher.

If the evaluator 220 produces output indicating no error found, the advertisement can be marked as approved by the automated advertisement evaluation system 200. Alternatively, if the evaluator 220 produces output indicating that an error was found, the advertisement can be marked as rejected. If the evaluator 220 produces output indicating either that a warning was found or that there is a need for manual review, the advertisement can be marked as requiring manually review. Thus, depending on the disparity in dimensions between the advertisement and the ad space size, the evaluator 220 can mark the advertisement as approved, rejected, or requiring manual review.

If an advertisement is rejected, the automated advertisement evaluation system 200 can generate an advertiser notification, which can be sent to, e.g., the advertiser submitting the advertisement. The notification can be a message notifying the advertiser of errors associated with the rejected advertisement. Once corrected, the advertisement can be resubmitted to the automated advertisement evaluation system 200. Additionally, output produced by the evaluator 220 can be stored, such as in a results database. The results database can be implemented as an online, e.g., web-based, storage database for organizing and categorizing advertisement related data.

Figure 3:
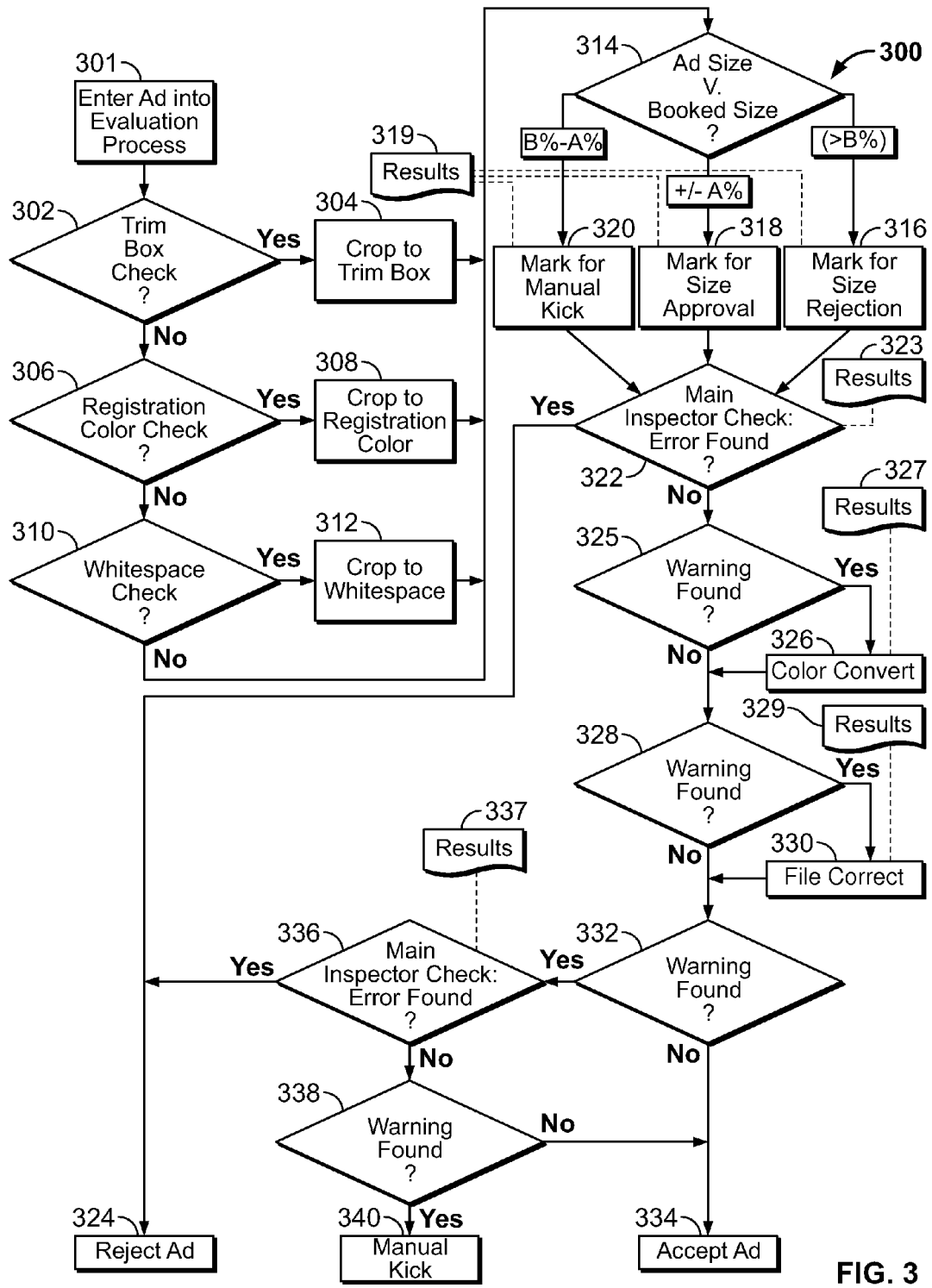
FIG. 3 shows an exemplary flowchart for evaluating the mechanical specifications of an advertisement submitted for publication.

FIG. 3 shows an exemplary flowchart describing an evaluation process 300 for evaluating the mechanical specifications of an advertisement submitted for publication. The evaluation process 300 can compare one or more characteristics and/or parameters associated with an ad with predetermined criteria and output one or more messages. For example, the messages output as a result of the evaluation process 300 can be classified as an error, a warning, or a manual review flag. The size of an advertisement can be evaluated to determine whether the dimensions of the advertisement are acceptable with respect to the size of the ad space of a publication in which the advertisement is to appear. Additionally, the evaluation process 300 can be implemented to correct one or more errors discovered in an advertisement that are classified as correctable.

An advertisement can be received electronically from an advertiser as an electronic document and electronically submitted to the evaluation process 301. The advertisement represented by the electronic document can be submitted to a trim box check to determine whether the advertisement includes a trim box or a trim box with crop marks (302). A trim box can include a shape, e.g., a box, that outlines the printable area of an advertisement. If a trim box is detected, the advertisement can be cropped in accordance with the trim box (304). Otherwise, the advertisement can be submitted to a registration color check (306). The registration color check (306) can be implemented to detect registration color marks at, e.g., the four corners of an advertisement's rectangular printable area. If a registration color is detected, the advertisement can be cropped in accordance with the registration color (308). Otherwise, the advertisement can be submitted to a white space check (310). The white space check (310) can be implemented to detect excess white space outside of the advertisement's printable area. If white space is detected, the advertisement can be cropped in accordance with the white space (312). If the advertisement includes no trim box, no registration color crop marks and no white space, the advertisement can be evaluated with respect to the advertisement's size information (314). Similarly, if the advertisement was cropped in response to a trim box, registration color, or white space, the cropped advertisement can be evaluated with respect to size (314).

For example, one or more dimensions of the electronic document representing an advertisement can be compared with one or more dimensions of the advertising space in a corresponding publication. If the difference between the size of the advertisement and the size of the advertising space differs with respect to one or more dimensions by more than a predetermined maximum value, the advertisement can be marked for rejection based on size (316). For example, if the size of the advertisement differs from the size of the advertising space by more than five percent, the advertisement can be automatically rejected.

If the difference between the size of the advertisement and the size of the advertising space differs by less than a predetermined minimum value with respect to all dimensions, the advertisement can be marked for size approval (318). For example, if the size of the advertisement differs from the size of the advertising space by less than two percent for all dimensions, the advertisement can be automatically accepted.

If the difference between the size of the advertisement and the size of the advertising space for one or more dimensions falls within a predetermined range, and the difference for each of the dimensions is less than the predetermined maximum value, the advertisement can be marked for manual evaluation (320). For example, if the size of the advertisement differs from the size of the advertising space by between two and five percent for any dimension and by less than five percent for all dimensions, the advertisement can be flagged for manual evaluation.

The amount by which the size of the advertisement can differ from the size of the advertising space can be set to any value. Further, the amount by which the size of the advertisement can differ from the size of the advertising space can be specified by an individual publisher, such that tolerable differences can vary by publication. The results of the size comparison for an advertisement can be recorded, such as in a database or other such data structure (319).

The advertisement can be presented to a main inspector check (322). The main inspector check can be configured to evaluate one or more attributes of an advertisement to detect any problems, including line width, resolution, and embedded fonts, as well as other such advertisement attributes. The attributes evaluated can be selected based on the mechanical requirements for an advertisement specified by the publisher to whom the advertisement will be provided. Further, one or more general attributes also can be evaluated. The results of the main inspector check evaluation (322) can be recorded, such as in a database or other such data structure (323).

If errors are found during the main inspector check, the advertisement can be automatically rejected (324). If no errors are found, the advertisement can be submitted to a warning inspection (325). If warnings are found during the warning inspection (325), or if the manual evaluation flag is set, the advertisement can be submitted to a color convert process (326). The color convert process can be configured to resolve one or more color problems associated with an advertisement. For example, the color convert process (326) can be configured to remove one or more colors that resulted in a warning. The color convert process (326) can be performed by any application or module, including a commercially available electronic document processing program, such as pdfColorConvert (or "kolor convert") by Callas Software GmbH. If no warnings or errors are found, and if the manual evaluation flag is not set, the advertisement can be submitted to the next evaluation stage in the evaluation process 300. Further, the results of one or more evaluations and processes, including the color convert process, can be recorded, such as in a database or other such data structure (327).

If the warning inspection (325) determines that the advertisement need not be submitted to the color convert process (326), or alternatively, after the advertisement has been submitted to the color convert process (326), the advertisement can be evaluated again to determine if other warnings associated with the advertisement remain (328). If any warnings are associated with the advertisement, or if the manual evaluation flag is set, the advertisement also can be submitted to a file correction process (330). The file correction process can be configured to correct any remaining correctable problems affecting the file. The file correction process can be performed by one or more applications or modules. Further, an application or module can be custom or a commercially available product. For example, if the electronic format of the advertisement corresponds to an Adobe®Acrobat® PDF, the advertisement can be submitted to a file correction procedure program, such as pdfCorrect (or "PDF Korrect") by Callas Software GmbH. The results of the file correction procedure (330) can be recorded, such as in a database or other such data structure (329).

If no warnings or manual review flags are associated with the advertisement, or after the advertisement exits the file correction procedure (330), the advertisement can again be evaluated to determine if other warnings (i.e., if the manual evaluation flag remains set) remain associated with the advertisement (332). If no warnings or errors are found, the advertisement can be automatically accepted (334). Otherwise, if any warnings are associated with the advertisement, or if the manual evaluation flag is set, the advertisement can be submitted for another main inspector check (336). As described above, the main inspector check can be implemented to evaluate one or more attributes of an advertisement to detect any problems, including line width, resolution, and embedded fonts, as well as other such advertisement attributes. The main inspector check (336) can be executed to verify that the necessary corrections were satisfactorily performed and to ensure that no additional errors exist in the advertisement. The results of the main inspector check (336) can be recorded, such as in a database or other such data structure (337).

If any errors were found during the main inspector check (336), the advertisement can be automatically rejected (324). In some implementations, a notification message can be generated and sent to the party that submitted the rejected advertisement. Further, the notification message can include one or more grounds for rejection. Thus, the advertiser can correct one or more errors associated with the advertisement and then resubmit the advertisement for approval. After the main inspector check (336) has been completed, the advertisement can be evaluated for warnings, and the presence of a manual evaluation flag in another warning inspection (338). If no warnings were found during the warning inspection (338), and if the manual evaluation flag is not set, the advertisement can be automatically accepted (334). Otherwise, if any warnings were found during the warning inspection (338), or if the manual evaluation flag is set, the advertisement can be marked for manual evaluation (340).

The advertisement evaluation process 300 can be modified to include one or more additional checks and/or evaluation processes, to delete one or more of the described checks and/or processes, and to alter the sequence of the evaluation process. In addition, the evaluation process 300 can be modified based on the mechanical requirements of the particular publication in which an advertisement is to appear. In some implementations, results can be recorded in a single database or record. For example, the databases 319, 323, 327, 329, and 337 can be implemented as a single database. In other implementations, the databases 319, 323, 327, 329, and 337 can be separate databases.

Figure 4:
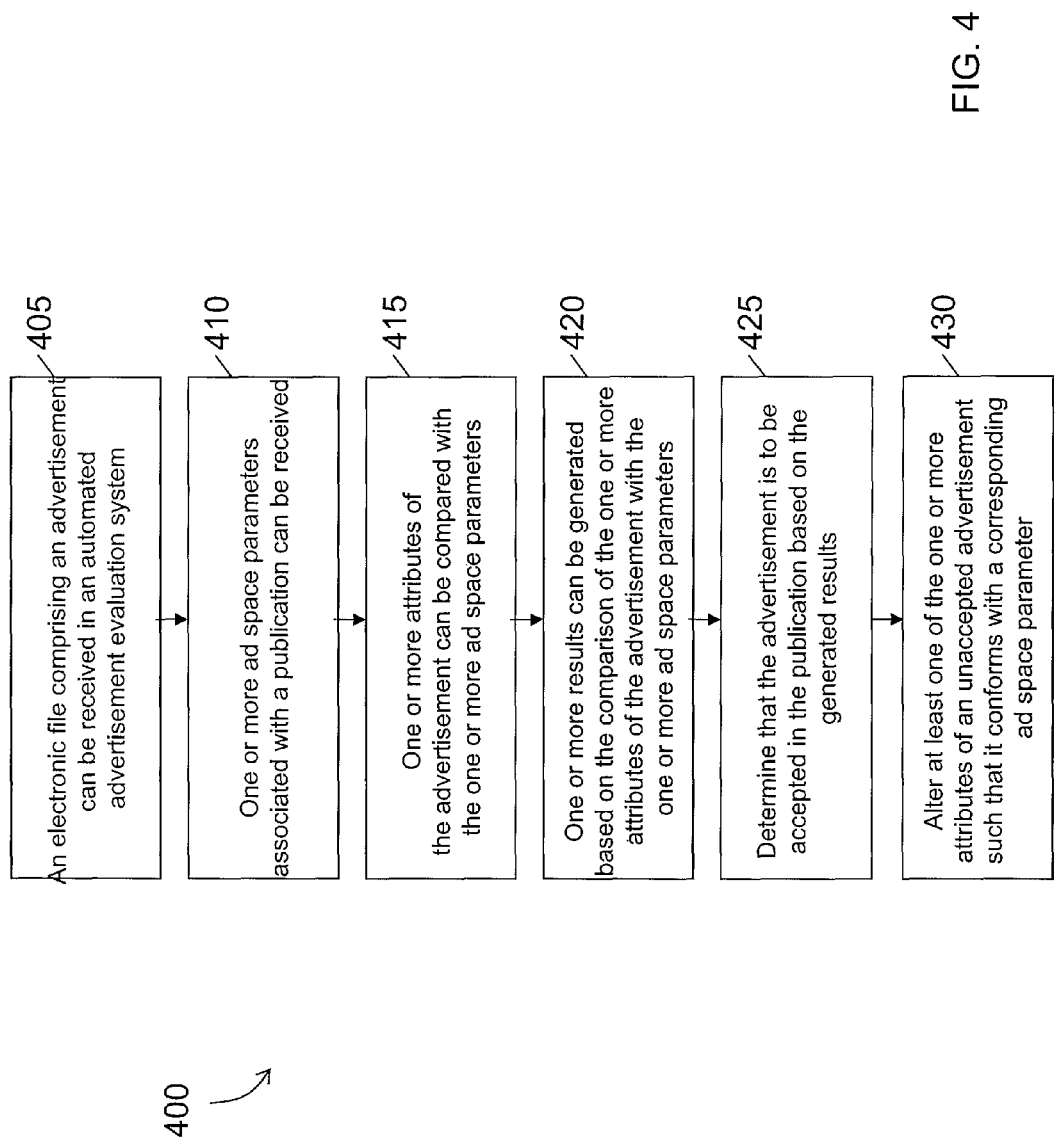
FIG. 4 shows a flow diagram describing an exemplary data input process for automatically evaluating advertisements.

FIG. 4 shows a flow diagram describing an exemplary data input process 400 for automatically evaluating advertisements. The data input process 400 can, for example, be implemented in the automated advertisement evaluation systems 100 and 200 of FIGS. 1 and 2, respectively, and the evaluation process 300 of FIG. 3.

An electronic file comprising an advertisement can be received in an automated advertisement evaluation system (405). The advertisement can be submitted to the automated advertisement evaluation system as an electronic file, such as in an electronic document format. In some implementations, the electronic document format can be Adobe® Acrobat® PDF. Further, the electronic file can be received from a machine-readable storage device over a communication network, a scanner, a portable data storage device, or other such electronic data transmitting and/or sharing devices. A graphical user interface can be used to indicate where the electronic file is stored and/or to upload the electronic file to the machine-readable storage device. Additionally, the electronic file can be submitted by an advertiser, a publisher, or a third party, such as through a graphical user interface. The electronic file can include graphics, text, borders, crop marks, white space, animations, meta data, as well as other such electronic file characteristics.

One or more ad space parameters associated with a publication can be received (410). The publication can be an electronic publication, such as an electronic magazine (or "e-zine") or weblog (or "blog"). Alternatively, the publication can be a print publication, such as a newspaper or magazine. The automated advertisement evaluation system can receive the one or more ad space parameters related to a publication from a machine-readable storage device over a communication network, a portable data storage device, or other such electronic data transmitting and/or storing devices. The one or more ad space parameters can be submitted by a publisher of the corresponding publication in which the advertisement is to appear. The one or more ad space parameters can include ad space size, line width, resolution, embedded fonts, color, publication section, as well as other such ad space parameters.

One or more attributes of the advertisement can be compared with the one or more ad space parameters (415). The one or more attributes of the advertisement can include ad size, line width, resolution, embedded fonts, color, publication page, publication section, presentation graphics, as well as other such advertisement attributes. The automated advertisement evaluation system can compare the one or more attributes of an advertisement with the one or more ad space parameters. For example, the automated advertisement evaluation system can compare the size of an advertisement submitted for inclusion in a publication with the ad space size of the publication. In such an example, if the size of the advertisement meets the mechanical specifications of the ad space in the publication, then the advertisement can be included in the publication. The comparison can occur automatically upon the automated advertisement evaluation system receiving an advertisement and one or more ad space parameters related to a publication.

One or more results can be generated based on the comparison of the one or more attributes of the advertisement with the one or more ad space parameters (420). The results can be submitted as output after the automated advertisement evaluation system completes the comparison of the one or more attributes with the one or more ad space parameters. Further, the results can be output as standard messages, such as no error, error, warning, or manual review. Based on the results, the automated advertisement evaluation system can mark the advertisement as approved, rejected, or flagged for manual evaluation. Marking an advertisement as approved can indicate that the one or more attributes of the advertisement were in accordance with the one or more ad space requirements of the publication and that no errors were present in the advertisement. Marking an advertisement as rejected can indicate that one or more errors found in the advertisement are not correctable and thus, the advertisement is not ready for publication. Flagging an advertisement for manual evaluation can indicate that one or more warnings were detected with respect to one or more attributes of the advertisement and that the advertisement requires manual review. Further, the results can be stored, such as in an electronic database. Additionally, the results can be categorized and organized for future publications.

Determine that the advertisement is to be accepted in the publication based on the generated results (425). The automated advertisement evaluation system can determine to include the advertisement in the publication according to one or more factors, such as predetermined publication error tolerance values. For example, if the advertisement's dimensions fall within a predetermined error tolerance range for the particular publication's mechanical specifications, then the automated advertisement evaluation system can mark the advertisement as approved and can determine that the advertisement should be included in the publication. Alternatively, if the advertisement's dimensions fall outside a predetermined error tolerance range for the particular publication's mechanical specifications, then the automated advertisement evaluation system can mark the advertisement as rejected and can determine that the advertisement should not be included in the publication. Moreover, if the advertisement's dimensions are in between the error tolerance range for automatic approval and automatic rejection for the particular publication's mechanical specifications, then the automated advertisement evaluation system can flag the advertisement for manual review.

Alter at least one of the one or more attributes of an unaccepted advertisement such that it conforms with a corresponding ad space parameter (430). The automated advertisement evaluation system can alter at least one of the one or more attributes of an advertisement which has been determined to be unacceptable for inclusion in a publication. For example, the automated advertisement evaluation system can alter one or more color attributes of the advertisement such that it conforms with a corresponding ad space parameter. Alternatively, the automated advertisement evaluation system can alter one or more size attributes of the advertisement such that it conforms with a corresponding ad space parameter. Moreover, the automated advertisement evaluation system can alter one or more color attributes and one or more size attributes of the advertisement such that it conforms with the corresponding ad space parameters. The automated advertisement evaluation system can determine to include the altered advertisement in the publication.

Figure 5:
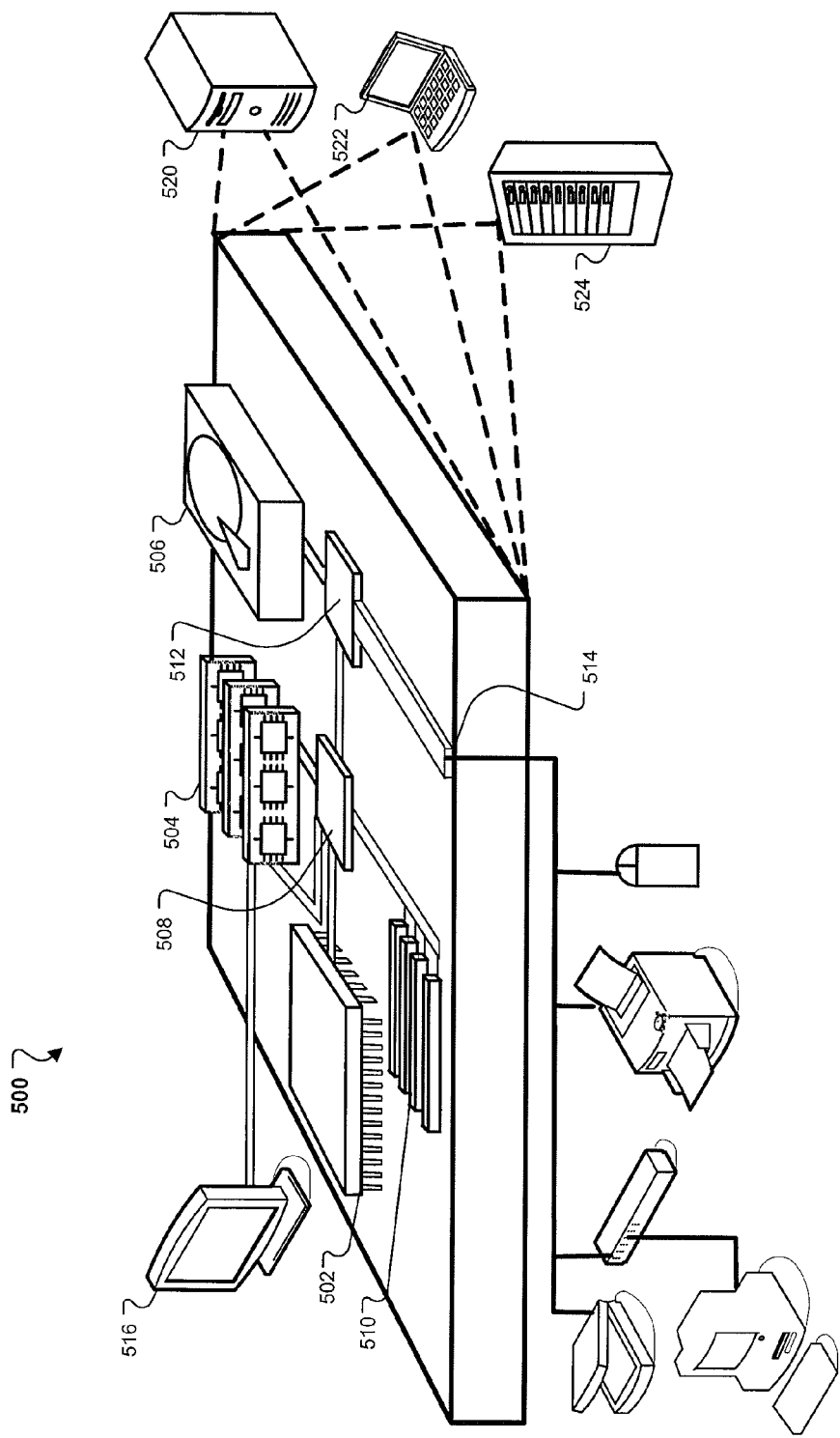
FIG. 5 is a schematic diagram of an exemplary computing device and system that can be used to implement automated mechanical approval of advertisement copy.

FIG. 5 is a schematic diagram of an example computing device and system that can be used to implement automated mechanical approval of advertisement copy. Computing device 500 is intended to represent various forms of digital computers, such as laptops, desktops, workstations, personal digital assistants, servers, mainframes, and other appropriate computers. The components shown here, their connections and relationships, and their functions, are meant to be exemplary only.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various buses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. Multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. The memory 504 can be a computer-readable medium. The memory 504 can be a volatile memory unit or units. The memory 504 can be a non-volatile memory unit or units.

The storage device 506 is capable of providing mass storage for the computing device 500. The storage device 506 can be a computer-readable medium. The storage device 506 also can be a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can contain instructions that, when executed, perform one or more methods, such as those described above. The information carrier can be a computer- or machine-readable medium, such as the memory 504, the storage device 506, memory on processor 502, or a propagated signal.

The high speed controller 508 can manage bandwidth-intensive operations for the computing device 500, while the low speed controller 512 can manage lower bandwidth-intensive operations. Such allocation of duties is exemplary only. The high-speed controller 508 can be coupled to memory 504, display 516 (e.g., through a graphics processor or accelerator), and to high-speed expansion ports 510, which can accept various expansion cards (not shown). The low-speed controller 512 can be coupled to storage device 506 and low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

A number of implementations have been disclosed herein. Nevertheless, it will be understood that various modifications can be made without departing from the spirit and scope of the claims. For example, the actions recited in the claims can be performed in a different order and still achieve desirable results. Accordingly, other implementations are within the scope of the following claims.

What is claimed is:

1. A computer-implemented method for evaluating an advertisement, the method comprising:
receiving an electronic file comprising an advertisement;
identifying attributes of the received advertisement;
receiving one or more ad space parameters associated with a printed publication;
receiving an evaluation specification that defines a maximum acceptable variance between the ad space parameters and the attributes;
automatically comparing one or more of the attributes of the advertisement with the one or more ad space parameters and the received evaluation specification;
automatically generating results based on the comparison of the one or more attributes of the advertisement with the one or more ad space parameters;
automatically determining to accept the advertisement for publication based on the generated results being within the received evaluation specification;
automatically determining not to accept the advertisement for publication based on the generated results being outside the received evaluation specification; and
automatically altering at least one of the one or more attributes of an unaccepted advertisement such that the attributes satisfy the ad space parameters.

2. The method of claim 1, wherein generating results further comprises designating the advertisement for approval, rejection, or manual review.

3. The method of claim 2, wherein the unaccepted advertisement is designated for rejection and excluded from publication.

4. The method of claim 1, wherein the attributes comprise at least one of white space, trim area, line width, resolution, or embedded fonts.

5. The method of claim 1, further comprising altering one or more color attributes of the advertisement such that it conforms with a corresponding ad space parameter.

6. The method of claim 1, further comprising altering one or more size attributes of the advertisement such that it conforms with a corresponding ad space parameter.

7. The method of claim 1, wherein determining whether to accept the advertisement includes evaluating a size of the advertisement relative to an ad space size defined by the one or more ad space parameters.

8. The method of claim 1, further comprising:
comparing one or more altered attributes with the one or more ad space parameters;
generating results based on the comparison of the one or more altered attributes with the one or more ad space parameters; and
determining whether to accept the advertisement for publication based on the generated results.

9. The method of claim 1, wherein the one or more ad space parameters comprise at least one of line width, resolution, embedded fonts, or publication section.

10. The method of claim 1, wherein evaluation specification comprises at least one of error tolerances, color ranges, font sizes, font styles, or size tolerances.

11. A computer program product, encoded on a non-transitory computer-readable medium, operable to cause data processing apparatus to perform operations comprising:
receiving an electronic file comprising an advertisement;
identifying attributes of the received advertisement;
receiving one or more ad space parameters associated with a printed publication;
receiving an evaluation specification that defines a maximum acceptable variance between the advertisement space parameters and the attributes;
automatically comparing one or more of the attributes of the advertisement with the one or more ad space parameters and the received evaluation specification;
automatically generating results based on the comparison of the one or more attributes of the advertisement with the one or more ad space parameters and the evaluation specification;
automatically determining to accept the advertisement for publication based on the generated results being within the received evaluation specification;

automatically determining not to accept the advertisement for publication based on the generated results being outside the received evaluation specification; and automatically altering at least one of the one or more attributes of an unaccepted advertisement such that the at least one attribute conforms with a corresponding ad space parameter.

12. The computer program product of claim 11, wherein generating results further comprises designating the advertisement for approval, rejection, or manual review.

13. The computer program product of claim 12, wherein the unaccepted advertisement is designated for rejection and excluded from publication.

14. The computer program product of claim 11, further operable to cause data processing apparatus to perform operations comprising altering one or more size attributes of the advertisement such that it conforms with a corresponding ad space parameter.

15. The computer program product of claim 11, wherein determining whether to accept the advertisement includes evaluating a size of the advertisement relative to an ad space size defined by the one or more ad space parameters.

16. The computer program product of claim 11, further operable to cause data processing apparatus to perform operations comprising:

comparing one or more altered attributes with the one or more ad space parameters;

generating results based on the comparison of the one or more altered attributes with the one or more ad space parameters; and determining whether to accept the advertisement for publication based on the generated results.

17. The computer program product of claim 11, further operable to cause data processing apparatus to perform operations comprising altering one or more color attributes of the advertisement such that it conforms with a corresponding ad space parameter.

18. The computer program product of claim 11, wherein evaluation specification comprises at least one of error tolerances, color ranges, font sizes, font styles, or size tolerances.

19. The system of claim 11, wherein evaluation specification comprises at least one of error tolerances, color ranges, font sizes, font styles, or size tolerances.

20. A system comprising:

a processor; and a computer readable medium storing a computer program for evaluating an advertisement, the computer program comprising instructions to cause the processor to perform operations comprising:

receiving an electronic file comprising an advertisement;

identifying attributes of the received advertisement;

receiving one or more ad space parameters associated with a printed publication;

receiving an evaluation specification from the publisher, the evaluation specification defining a maximum acceptable variance between the advertisement space parameters and the attributes;

automatically comparing one or more of the attributes of the advertisement with the one or more ad space parameters and the received evaluation specification;

automatically generating results based on the comparison of the one or more attributes of the advertisement with the one or more ad space parameters;

automatically determining to accept the advertisement for publication based on the generated results being within the received evaluation specification;

automatically determining not to accept the advertisement for publication based on the generated results being outside the received evaluation specification; and automatically altering at least one of the one or more attributes of an unaccepted advertisement—such that the attributes satisfy the advertisement space parameters.

21. The system of claim 20, wherein the one or more computers comprise a server operable to interact with the user interface device through a data communication network, and the user interface device is operable to interact with the server as a client.

22. The system of claim 20, the operations further comprising altering one or more color attributes of the advertisement such that it conforms with a corresponding ad space parameter.

23. The system of claim 20, the operations further comprising altering one or more size attributes of the advertisement such that it conforms with a corresponding ad space parameter.

24. The system of claim 20, wherein determining whether to accept the advertisement includes evaluating a size of the advertisement relative to an ad space size defined by the one or more ad space parameters.

25. The system of claim 20, the operations further comprising:

comparing one or more altered attributes with the one or more ad space parameters;

generating results based on the comparison of the one or more altered attributes with the one or more ad space parameters; and determining whether to accept the advertisement for publication based on the generated results.

26. The system of claim 20, wherein generating results further comprises designating the advertisement for approval, rejection, or manual review.

27. The system of claim 26, wherein the unaccepted advertisement is designated for rejection and excluded from publication.

* * * * *

UNITED STATES PATENT AND TRADEMARK OFFICE
CERTIFICATE OF CORRECTION

| | | |
|---|---|---|
| PATENT NO. | : 8,189,231 B1 | Page 1 of 1 |
| APPLICATION NO. | : 12/211755 | |
| DATED | : May 29, 2012 | |
| INVENTOR(S) | : Isaac Taylor | |

It is certified that error appears in the above-identified patent and that said Letters Patent is hereby corrected as shown below:

Title page, column 2 Item [56] (Other Publications), entry 2, line 1 (Other Documents):
Please delete "Adminstrator's" and insert -- Administrator's --, therefor.

In column 16, line 18: Please delete "advertisement — such" and insert -- advertisement such --, therefor.

In column 15, line 41, claim 19: Please delete "11" and insert -- 20 --.

Signed and Sealed this
Eleventh Day of December, 2012

David J. Kappos
*Director of the United States Patent and Trademark Office*